UNITED STATES PATENT OFFICE.

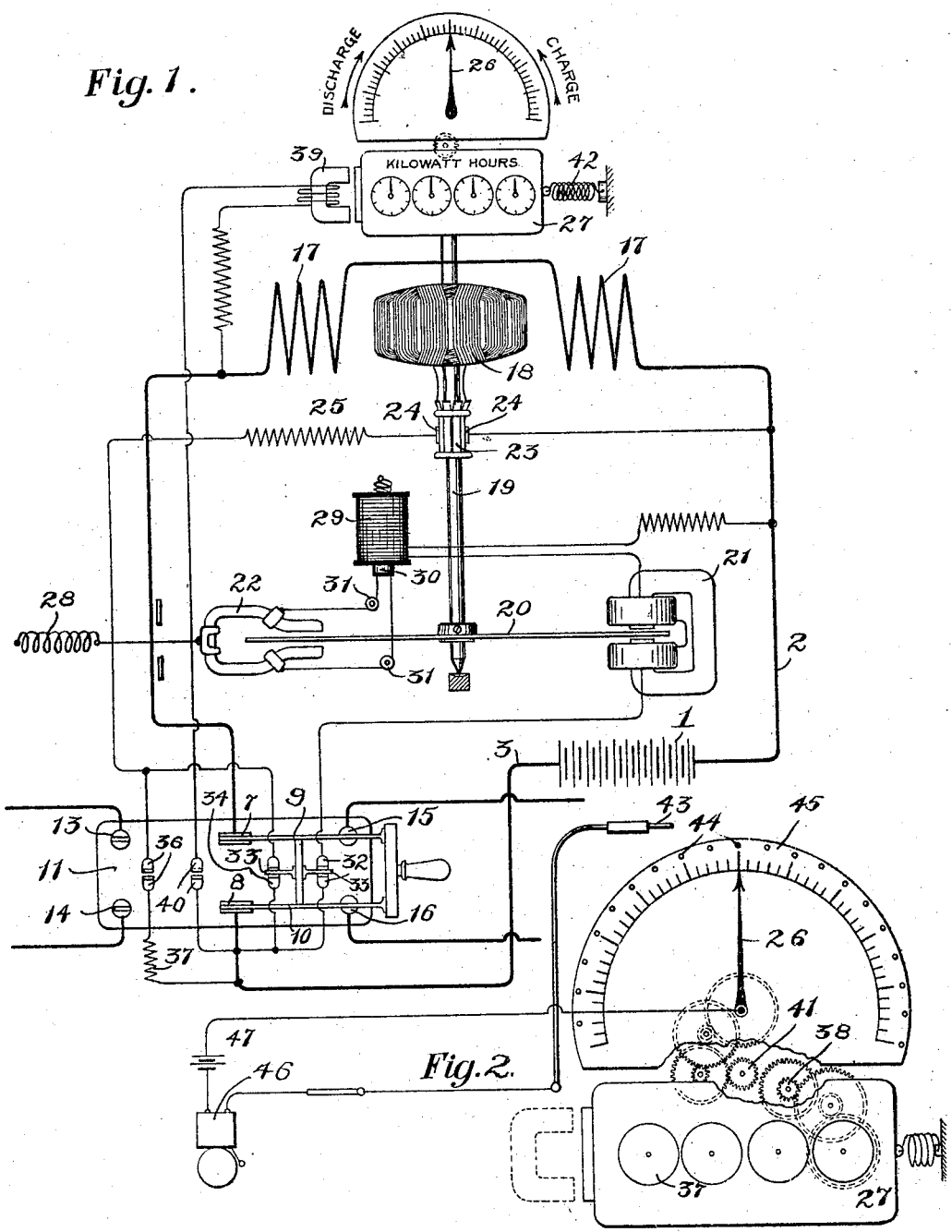

THOMAS DUNCAN, OF CHICAGO, ILLINOIS

ELECTRICAL MEASURING INSTRUMENT.

No. 796,054.  Specification of Letters Patent.  Patented Aug. 1, 1905.

Application filed August 26, 1901. Renewed January 7, 1905. Serial No. 239,977.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to meters designed for use in connection with storage batteries, and has for its object—

First. The provision of an integrating attachment that is brought into connection with the rotating element of the meter to integrate the energy supplied to the battery in charging, this measuring attachment being disconnected from the meter when the battery is connected in circuit with the translating means. In this manner a battery may receive successively several charges before payment need be made for the energy supplied.

Second. The provision of an alarm that is actuated by the meter when a predetermined quantity of energy has been discharged from the storage battery, so that the consumer may be warned that there only remains a sufficient quantity to perform the required work. For example, this feature of the invention is particularly adaptable for use in connection with storage batteries operating automobiles. The consumer may ride a certain distance into the country and upon the operation of the alarm will know that there is only sufficient current in the battery to return.

The third object of my invention is to provide means for compensating for the inefficiency of the storage battery in discharging. In practicing this feature of my invention I prefer to include regulating means in shunt of the battery that serves to properly modify the rate of operation of the meter per unit of load or energy. For this purpose a load in the form of a magnetic drag, preferably including a permanent magnet, is employed. This permanent magnet is shifted toward and from a damping-disk by the regulating means.

I will explain my invention more fully by reference to the accompanying drawings, illustrating the preferred embodiment thereof, in which—

Figure 1 illustrates the application of the meter to a storage-battery system, and Fig. 2 is a view of the gearing interposed between the rotating element of the meter and the indicating and integrating mechanisms.

Like parts are indicated by similar characters of reference in both views.

In the drawings a storage battery 1 is illustrated having mains 2 and 3, the main 2 terminating in a pivotal mounting 7, while the main 3 terminates in a pivotal mounting 8. Switch-blades 9 and 10 of a switch 11 are supported upon mountings 7 and 8. Terminals of a charging-circuit 13 and 14 are illustrated. Terminals 15 and 16 of conductors leading to translating means are also illustrated. When the switch 11 is thrown to the left, the charging-machine or source of current is thrown into circuit with the storage battery. When said switch is thrown to the right, the storage battery is placed in circuit with the translating means.

I have illustrated a meter having a current-winding included in the main 2, this current-winding being subdivided into coils 17 17. The meter is also provided with a pressure-winding 18, included in bridge between the battery leads or mains. These windings of the meter are constantly in circuit with the battery irrespective of its association with the charging-machine or the translating means. The meter-winding 18 is preferably in the form of an armature and is mounted upon a spindle 19, at the lower end of which is provided a disk 20, arranged within the fields of a damping-electromagnet 21 and a permanent magnet 22. The shaft 19 also carries the commutator 23, against which bear the brushes 24 24, that serve to include the armature of the meter in circuit, a choking resistance 25 being also included in circuit with the armature. The meter is provided with gearing at its upper end to actuate the measuring-index 26 both while the battery is discharging and is being charged and an integrating mechanism 27 only while the battery is being charged, as will be hereinafter more fully set forth. The magnet 22 is bodily movable, being mounted to reciprocate. A spring 28 is adapted when unopposed to move the magnet to its extreme position, this adjustment occurring while the battery is being charged, whereby the greatest braking effect permitted the said magnets is secured, thereby reducing the rate of operation of the meter while the battery is being charged. In order to increase the rate of operation of the meter to compensate for battery loss while the battery is discharging, the magnet is moved toward the center of the disk to reduce the braking action, permitting a corresponding increase in the rate of operation of the meter per unit of load or energy. To secure this control of the permanent magnet, an electromagnetic device 29 is employed, whose winding is preferably included in series with the winding of the magnet 21, the said winding of 29 being thus preferably subject to the pressure of the battery. The winding of the magnet 21 also produces a compensating load, the physically-fixed magnet 21 with a variable field, and the physically-adjustable magnet 22 with the permanent field, coöperating to compensate for the inefficiency of the battery as it discharges. The magnet 22 is at the periphery of the disk 20, and magnet 21 has no influence when the battery is being charged, as the controlling device 29 and the magnet 21 are both out of circuit. When the battery is being discharged, however, the magnet 22 is drawn toward the center of the disk in compensation for the action of magnet 21 upon the disk.

Several means may be provided for effecting an operative relation between the devices 29 and 22. I have illustrated the device 29 formed of a solenoid whose core 30 is connected with the magnet 22 by means of cords passing over pulleys 31 31, whereby a direct transverse movement of the magnet 22 is effected.

I prefer to provide means whereby the modifying influence of the devices 21 and 29 is removed while the battery is being charged, whereby the magnet 22 may be moved to its extreme outermost position to impose upon the meter a sufficient load that properly reduces the rate of operation of the meter per unit of load or energy while the battery is being charged. For this purpose the shunt-conductor, including the devices 21 and 29, is provided with terminal contacts 32 32, that are electrically connected by means of a supplemental switch-plate 33, provided upon the switch 11 when the said switch is thrown to the right to connect the translating means with the storage battery. When the switch is thrown to the left, the connection between the contacts 32 is broken, thereby removing the devices 21 and 29 from circuit and permitting the spring 28 to withdraw the magnet 22 to its outermost position to place the proper load upon the meter. The armature-circuit is also provided with two terminals 34, that are closed by a second supplemental switch-blade 35, carried by the switch 11 when the said switch is thrown to the right. A by-path adapted for inclusion in circuit with the armature is provided with contacts 36, that are connected by the supplemental blade 33 when the switch is thrown to the left, whereby a torque-reducing resistance 37 is included in circuit with the armature when the battery is being charged to further compensate for the removal of the load furnished by the magnet 21.

It is desired to integrate the energy supplied to a given storage battery during successive charges to avoid the annoyance of entering charges or paying for the energy supplied each time the battery is charged. For this purpose I provide an integrating counting mechanism 37, whose actuating wheel-train 38 is to be disconnected from the rotating element of the meter while the battery is discharging, but is to be connected with the meter while the battery is being charged. For effecting this engagement between the rotating element of the meter and the integrating mechanism 37 I employ an electromagnet 39, whose armature is carried by the casing of the integrating mechanism and whose winding is adapted for inclusion in bridge of the mains leading to the charging-machine when the switch 11 is thrown to the left, the supplemental blade 35 then connecting contacts 40, included in the magnet-circuit, whereupon the wheel-train 38 is bodily moved to the left to be brought into engagement with a pinion 41, that is then adapted to simultaneously actuate the indicator 26 and the integrating mechanism, this pinion 41 serving to actuate the indicator alone when the storage battery is discharging. A spring 42 is employed for the purpose of moving the integrating mechanism to the right when the magnet 39 is deënergized upon moving the switch 11 to the right to thereby effect disconnection between the rotating element of the meter and the integrating mechanism.

As an alarm to indicate when a predetermined fraction of the energy within the battery has been consumed I prefer to employ a plug 43, which is adapted for insertion within any one of a series of holes 44, provided in the metal face of the reading-dial 45. The index 26 constitutes one terminal of an alarm-circuit 46, the other terminal of which alarm-circuit is connected with the plug or the metal frame or plate supporting the reading-dial, the alarm-circuit being normally open. The metal plug 43, by insertion within the selected hole 44, is placed in the path of the index-needle, so that when the meter is operated to bring the index into engagement with the plug 43 the alarm is actuated. I prefer to employ as an alarm a single-stroke bell 46 in circuit with a battery 47. A manually-operated switch may be employed, if desired, to further control the alarm-circuit.

It will thus be seen that by means of my invention I am enabled to compensate for various rates of battery-discharge through the use of load-changing means which are responsive to changes in battery-pressure. It is well known that the pressure from the battery is dependent upon the rate of discharge, the open-circuit pressure of the battery being always higher than the pressure of the battery upon closed circuit. In this manner when an abnormal current is taken from the battery the pressure is decreased to effect an operative change of the load-producing means, thus to change the rate of operation of the meter per unit of load or energy.

It is obvious that changes may readily be made from the embodiment of my invention herein shown and particularly described, and I do not, therefore, wish to be limited to the precise disclosure herein set forth; but,

Having thus described my invention, I claim as new and desire to secure by Letters Patent—

1. The combination with a storage battery, of a switch for connecting the same in circuit with a charging-machine or source of current and a translating means, a meter receiving current passing through the battery, an indicating element for measuring energy supplied to the battery and discharged therefrom, an integrating element, and means for dissociating the same from the meter without dissociating the indicating element, substantially as described.

2. The combination with a storage battery, of a switch for connecting the same in circuit with a charging-machine or source of current and a translating means, a meter receiving current passing through the battery, an indicating element for measuring the energy supplied to the battery and discharged therefrom, an integrating element, and means for connecting the integrating element with the motor element of the meter when the storage battery is connected with the charging-machine or source of current and disconnecting the said integrating element from the motor element of the meter when the storage battery is brought into circuit with the translating means, substantially as described.

3. The combination with a storage battery, of a switch for connecting the same in circuit with a charging-machine or source of current and a translating means, a meter receiving current passing through the battery, an indicating element for measuring energy supplied to the battery and discharged therefrom, a pinion 41 operated by the meter, an integrating element having an actuating wheel-train, an electromagnet for moving the integrating element in one direction, means for governing the circuit through the said electromagnet to actuate the integrating element, and means for moving the integrating element in the opposite direction when relieved of the influence of the said electromagnet, whereby the amount of energy supplied to the storage battery in several charges may be integrated, substantially as described.

4. The combination with a storage battery, of a meter receiving current passing through the battery, an indicating element for measuring energy supplied to the battery and discharged therefrom, an integrating element, and means for dissociating the same from the meter without dissociating the indicating element, substantially as described.

5. The combination with a storage battery, of a meter receiving current passing through the battery, an indicating element for measuring the energy supplied to the battery and discharged therefrom, an integrating element, and means for connecting the integrating element with the motor element of the meter when the storage battery is connected with the charging-machine or source of current and disconnecting the said integrating element from the motor element of the meter when the storage battery is brought into circuit with the translating means, substantially as described.

6. The combination with a storage battery, of a meter receiving current passing through the battery, an indicating element for measuring energy supplied to the battery and discharged therefrom, a pinion 41 operated by the meter, an integrating element having an actuating wheel-train, an electromagnet for moving the integrating element in one direction, means for governing the circuit through the said electromagnet to actuate the integrating element, and means for moving the integrating element in the opposite direction when relieved of the influence of the said electromagnet, whereby the amount of energy supplied to the storage battery in several charges may be integrated, substantially as described.

7. The combination with a storage battery, of a switch for connecting the same in circuit with the charging-machine or source of current and a translating means, a meter receiving current passing through the battery, an indicating element for measuring energy supplied to the battery and discharged therefrom, an integrating element, and means for dissociating the same from the meter without dissociating the indicating element and an alarm operated by the meter, substantially as described.

8. The combination with a storage battery, of a switch for connecting the same in circuit with a charging-machine or source of current and a translating means, a meter receiving current passing through the battery, an indicating element for measuring energy supplied to the battery and discharged therefrom, an integrating element, means for dissociating the same from the meter without dissociating the indicating element, a dragging-magnet for modifying the speed of the meter, a damping-disk or retarding element within the field of said magnet, and means for adjusting the position of the magnet to compensate for battery loss, substantially as described.

9. The combination with a storage battery, of a switch for connecting the same in circuit with the charging-machine or source of current and a translating means, a meter receiving current passing through the battery, an indicating element for measuring the energy supplied to the battery and discharged therefrom, an integrating element, means for connecting the integrating element with the motor element of the meter when the storage battery is connected with the charging-machine or source of current and disconnecting the said integrating element from the motor element of the meter when the storage battery is brought into circuit with the translating means, an alarm-circuit, an adjustable contact-pin acting in conjunction with the indicating mechanism to close the alarm-circuit, a dragging-magnet for modifying the speed of the meter, a damping-disk or retarding element within the field of the said magnet, and means for adjusting the position of the magnet to compensate for battery loss, substantially as described.

In witness whereof I hereunto subscribe my name this 16th day of August, A. D. 1901.

THOMAS DUNCAN.

Witnesses:
   GEORGE L. CRAGG,
   HERBERT F. OBERGFELL.